Oct. 14, 1952  F. L. GATCHET  2,613,922
SOLUTION MIXING AND DISTRIBUTING APPARATUS
Filed Jan. 13, 1950

INVENTOR.
FRANCIS L. GATCHET
BY Cook & Robinson
ATTORNEYS

Patented Oct. 14, 1952

2,613,922

UNITED STATES PATENT OFFICE 2,613,922

SOLUTION MIXING AND DISTRIBUTING APPARATUS

Francis L. Gatchet, Gardiner, Wash.

Application January 13, 1950, Serial No. 138,335

2 Claims. (Cl. 259—4)

This invention relates to apparatus designed to be used for the dissolving and application of soil fertilizing materials of those kinds that are required to be dissolved in water and are applied by spraying or otherwise distributing the solution over the ground area that is to be fertilized; one of such fertilizing materials now in general use being granular ammonium sulphate. More specifically stated, the present invention resides in the provision of a novel apparatus that is characterized by a mixing tank of specific form in which the granular fertilizing material is caused to be dissolved in water for its distribution to the area to be treated, as a weak aqueous solution.

It is the principal object of this invention to provide an improved form of dissolving and mixing tank for use in the present apparatus, that is designed to facilitate the dissolution of material and at the same time to prevent undissolved material from being carried out with the solution.

More specifically stated, it is the object of this invention to provide a dissolving and mixing tank, of circular form and an outlet pipe extended into the tank upwardly through the bottom at the axial center, and also there being means for forcible delivery of water into the tank in a manner to cause a centrifugal whirling of the solution whereby the undissolved material or solids are caused to be centrifuged for rapid dissolution and also kept away from the centrally located outlet.

It is also an object of this invention to provide a mixing tank of the above kind in combination with a pump that operates both to forcibly deliver water into the tank and to draw the solution therefrom for distribution over a ground area. Also, to equip the outlet with an automatically, water activated valve that operates to prevent the undesirable sucking of air into the pump should the level of the solution fall below the level of the water outlet.

Further objects and advantages of the present invention reside in the details of construction of parts and in their combination and mode of use, as will hereinafter be fully described.

In accomplishing these and other objects of the invention, I have provided the improved details of construction, the preferred forms of which are illustrated in the accompanying drawings, wherein—

Referring more in detail to the drawings—

Figure 2:
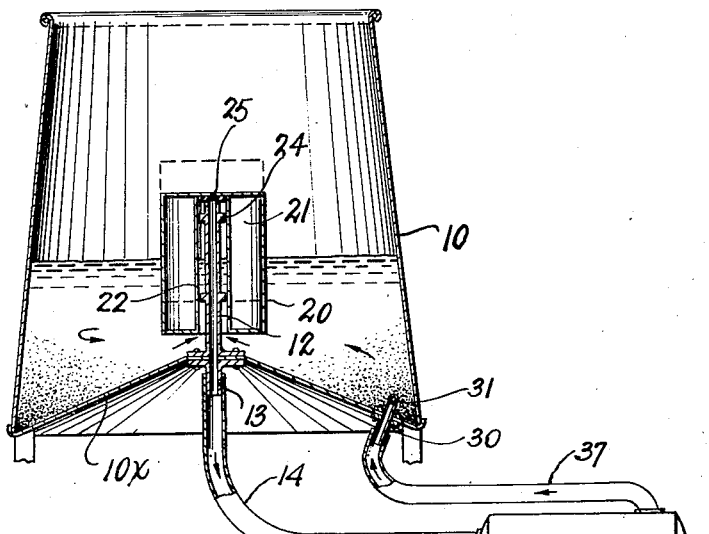
Fig. 2 is a central, cross-sectional view of the tank together with a diagrammatic illustration of its connections with a pump.
Figures 3, 4:
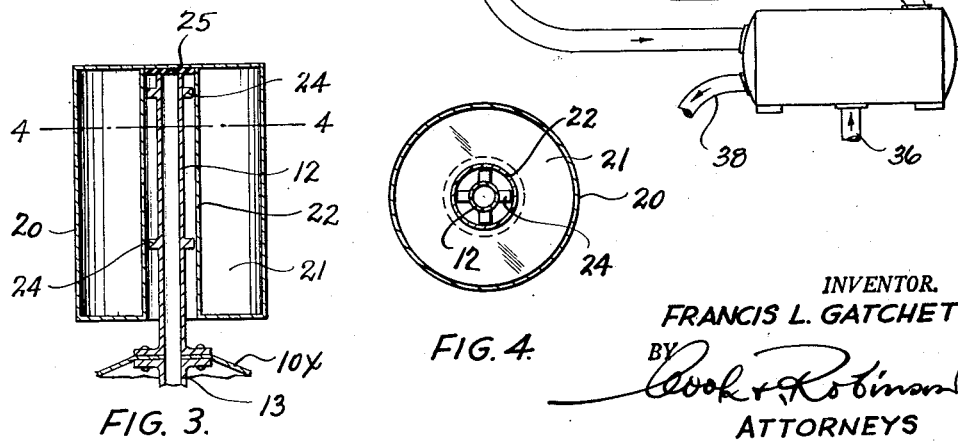
Fig. 3 is a somewhat enlarged cross-sectional view, in a vertical, plane of the float valve mechanism.
Fig. 4 is a cross-sectional view of the float valve on line 4—4 in Fig. 3.

The mixing tank which I prefer to use in connection with this apparatus, as shown best in Fig. 2, is in the form of a circular tub or tank 10. It is formed with side walls that are slightly inwardly inclined from bottom to top of the tank in order to counteract the tendency of the whirling body of water contained therein to rise along the walls. The tank 10, as illustrated, has an upwardly directed conical bottom 10x of about a 20° slope, however, for reasons of manufacturing and cost it may be desirable to use a flat bottom tank. Entering the tank at the axial center of the conical bottom is a vertical outlet or discharge pipe 12, equipped at its lower end with a nipple 13 to which a hose 14, or the like, is applied for connection with the suction side of a power operated pump presently described.

The pipe 12 extends upward in the tank to a predetermined extent, here shown as about the center of the tank. At its upper end this pipe is open for receiving the solution from the tank when it rises therein above the level of the said open end.

Fitted over the upper end portion of pipe 12 for free up and down travel thereon, is a float valve 20 of cylindrical form. This valve has a sealed air chamber 21 and also a central cylindrical guideway 22 in which the upper end portion of the pipe 12 is slidably contained. Guide lugs 24 are formed on the pipe to retain the float in proper position and in the upper end of the valve is a gasket 25 of soft material designed to engage flatly against the upper end surface of the pipe 12 when the level of liquid falls and the float moves down to such extent that air would otherwise be sucked into the pump through the pipe 12. In place of the gasket, a valve with a metal to metal ground seat may be used if desired or required.

Figure 1:
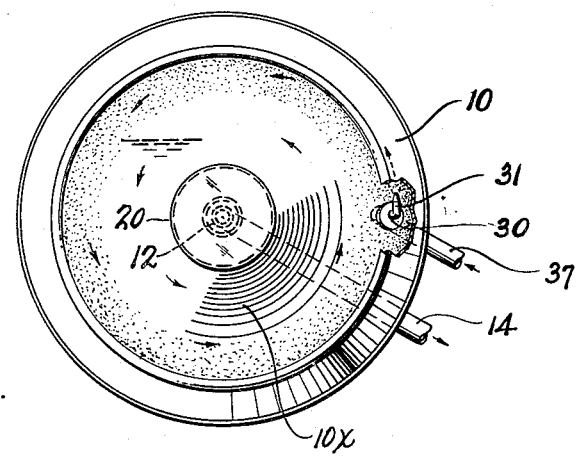
Fig. 1 is a top, or plan view of the solution mixing tank employed with the apparatus of the present invention.

Water is delivered into the tank through a pipe fitting 30 that enters through the bottom 10x adjacent a side wall of the tank. This pipe fitting 30 has a laterally directed nozzle portion 31, at its upper end, closely adjacent the bottom 10x as shown in Fig. 1, whereby water is discharged horizontally into the tank and in a tangental direction thus to keep the solution in the tank whirling about the tank axis.

It is intended that water shall be forcibly delivered into the tank 10 by the same pump that withdraws solution for distribution to the ground area. In Fig. 2 I have indicated a common type of double acting pump at 35. This pump comprises a casing with water inlet at 36. A hose connection is designated at 37, leading from a discharge side of the pump to pipe fitting 30. The suction hose 14 leads from the tank nipple 13 to the pump. Also, a discharge pipe, designated at 38, leads from the pump to point of use of the solution.

Assuming the apparatus to be so constructed, it is used as follows: First, the hose 36 is extended into a source of water supply, such as a river or tank, and the pump 35 is then set in motion. When a certain amount of water has been delivered into the tank 10 through the hose 37 and nozzle 31, a specified amount of the granular material, such as ammonium sulphate, is dumped into the tank. The manner in which the water is discharged into the tank from nozzle 31 causes a centrifugal whirl to be set up therein and thus the undissolved material is centrifuged toward the sides of the tank. When the water rises to a certain height in the tank, above the inlet to pipe 12, the float valve 20 will be lifted and the pump will then operate to withdraw solution through the pipe 12 and hose 14 and deliver it to a point of use through hose 38. At any time the level of water falls to an extent that would permit air to be sucked into the pipe 12 by the pump, the gasket 25 in the float valve will be seated over the open end of the pipe and the suction line closed, thus to keep the pump primed.

It will be understood that by the means described, the undissolved material will be kept away from the inlet to pipe 12 and only the weak solution will be withdrawn. Dissolution of material is expedited yet no solution that is too strong will be withdrawn.

Though I have illustrated and described the use of a common type float valve, it may be necessary or desirable to use other means or valves to seal or open the upper end of the outflow pipe. Such a valve may be activated by the whirling motion of the fertilizing solution. It is only necessary that the valve be activated by the water and be adapted to automatically close or become seated when the solution is not flowing so that the pump will retain its prime.

Also, I have indicated a preference for a mixing tank which contains a conically shaped bottom, however, it would be satisfactory to use a flat bottom tank which would be less expensive and more readily available. The centrifugal action of the whirling solution would tend to keep the undissolved material about the circumference of the tank and away from the discharge pipe so that only the weak solution would be drawn out.

Devices of this kind may be made in various sizes and of various materials. They may be mounted on sleds or other vehicles and moved easily to various points of use.

It is not my desire or intention that my invention be limited or construed as comprising a tank of a particular size or shape or that a specific type of valve or pump be used to control the outflow from the tank. Rather my invention is to be understood as comprising a novel combination of elements utilized in producing a new and useful device.

Having thus described my invention, what I claim as new therein and desire to secure by Letters Patent, is:

1. In a solution mixing and distributing apparatus, a vertically disposed mixing tank of circular form, equipped with an upwardly pointed conical bottom, an outlet pipe extended into the tank through the said bottom and along the axial center of the tank; said pipe terminating substantially above the bottom in an open upper end for receiving solution from the tank, a pump operable to forcibly deliver water into the tank adjacent the bottom wall thereof and in tangental direction to cause the liquid body to whirl axially in the tank with centrifuging effect on undissolved material contained therein and to withdraw liquid from the tank through the outlet pipe, and a solution value adapted to rise and fall with the liquid in the tank and to close over the open end of the outlet pipe when the level of solution drops to a predetermined level.

2. A solution mixing apparatus comprising in combination; a vertically disposed tank of circular form, an outflow pipe extended into the tank, upwardly through the bottom along the axial center, and terminating in an open end at a distance spaced substantially above the bottom, a water supply pipe having a discharge nozzle extended into the tank adjacent the tank bottom to discharge water tangentally into the tank and cause the body of liquid therein to whirl with centrifuging effect on undissolved solids therein, a double acting pump having one suction inlet connected with a source of water supply and the corresponding discharge side connected to said nozzle, and said pump having its other suction inlet connected to said outlet pipe for withdrawal of solution from the tank and to deliver it through the corresponding discharge side, and a float valve applied to the said outflow pipe to close over the open end thereof when the level of liquid in the tank falls below the said open end.

FRANCIS L. GATCHET.

REFERENCES CITED

The following references are of record in the file of this patent:

UNITED STATES PATENTS

| Number | Name | Date |
| --- | --- | --- |
| 130,490 | Dick | Aug. 13, 1872 |
| 1,580,476 | Fassio | Apr. 13, 1926 |
| 1,775,554 | Dehle | Sept. 9, 1930 |
| 1,843,157 | Howe | Feb. 2, 1932 |
| 1,872,462 | Johnson et al. | Aug. 16, 1932 |
| 1,944,836 | Cowles | Jan. 23, 1934 |
| 2,003,069 | Carter | May 28, 1935 |
| 2,432,175 | Schmidt | Dec. 9, 1947 |
| 2,451,715 | Caldwell | Oct. 19, 1948 |